United States Patent
Sandham

(10) Patent No.: US 11,012,298 B2
(45) Date of Patent: *May 18, 2021

(54) METHODS, SYSTEMS, AND COMPUTER READABLE MEDIUMS FOR SELECTING AND CONFIGURING A COMPUTING SYSTEM TO SUPPORT A REPLICATED APPLICATION

(71) Applicant: EMC IP HOLDING COMPANY LLC, Round Rock, TX (US)

(72) Inventor: Adrian John Sandham, Cork (IE)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,050

(22) Filed: Jan. 24, 2020

(65) Prior Publication Data

US 2020/0213196 A1  Jul. 2, 2020

Related U.S. Application Data

(63) Continuation of application No. 14/626,358, filed on Feb. 19, 2015, now Pat. No. 10,587,465.

(51) Int. Cl.
*H04L 12/24* (2006.01)
*H04L 29/08* (2006.01)

(52) U.S. Cl.
CPC ...... *H04L 41/0813* (2013.01); *H04L 67/1095* (2013.01)

(58) Field of Classification Search
CPC .................. H04L 41/0813; H04L 67/1095
See application file for complete search history.

(56) References Cited

U.S. PATENT DOCUMENTS

| 6,609,123 | B1 | 8/2003 | Cazemier et al. |
| 8,533,724 | B1* | 9/2013 | Theimer ............. G06F 9/45558 718/104 |
| 8,639,827 | B1 | 1/2014 | Dinn et al. |

(Continued)

OTHER PUBLICATIONS

Non-Final Office Action for U.S. Appl. No. 15/369,241, (dated May 7, 2020).

(Continued)

*Primary Examiner* — Philip J Chea
*Assistant Examiner* — Robert B McAdams
(74) *Attorney, Agent, or Firm* — Jenkins, Wilson, Taylor & Hunt, P.A.

(57) ABSTRACT

Methods, systems, and computer readable mediums for selecting and configuring a computing system to support a replicated application are disclosed. According to one example, a method includes capturing resource availability data associated with a plurality of computing systems, wherein each of the plurality of computing systems resides at a separate and distinct geographical site. The method further includes determining, for each of the plurality of computing systems, a suitability score based on the captured resource availability data and at least one external factor associated with the computing system, selecting one of the plurality of computing systems to host the replicated application based on the determined suitability scores, and establishing a logical environment on the selected computing system to support the enterprise application.

20 Claims, 3 Drawing Sheets

(56) References Cited

U.S. PATENT DOCUMENTS

| | | | |
|---|---|---|---|
| 9,075,788 | B1 | 7/2015 | Roth et al. |
| 9,083,625 | B2 | 7/2015 | Nandyalam et al. |
| 9,473,365 | B2 | 10/2016 | Melander et al. |
| 10,587,465 | B1 | 3/2020 | Sandham |
| 2003/0005090 | A1 | 1/2003 | Sullivan, Jr. et al. |
| 2004/0143811 | A1 | 7/2004 | Kaelicke et al. |
| 2005/0198333 | A1 | 9/2005 | Dinges et al. |
| 2006/0161563 | A1 | 7/2006 | Besbris et al. |
| 2010/0050173 | A1 | 2/2010 | Hensbergen |
| 2012/0110055 | A1 | 5/2012 | Van Biljon et al. |
| 2015/0234682 | A1 | 8/2015 | Dageville et al. |
| 2015/0236971 | A1* | 8/2015 | Sesha ............... H04L 43/16 709/226 |

OTHER PUBLICATIONS

Advisory Action for U.S. Appl. No. 15/369,241, (dated Jan. 30, 2020).
Notice of Allowance and Fee(s) Due for U.S. Appl. No. 14/626,358, (dated Nov. 20, 2019).
Final Office Action for U.S. Appl. No. 15/369,241, (dated Nov. 15, 2019).
Non-Final Office Action for U.S. Appl. No. 15/369,241, (dated Jul. 18, 2019).
Advisory Action for U.S. Appl. No. 15/369,241, (dated May 31, 2019).
Non-Final Office Action for U.S. Appl. No. 14/626,358, (dated May 3, 2019).
Final Office Action for U.S. Appl. No. 15/369,241, (dated Mar. 19, 2019).
Pre-Brief Appeal Conference Decision for U.S. Appl. No. 14/626,358, (dated Jan. 22, 2019).
Advisory Action for U.S. Appl. No. 14/626,358, (dated Oct. 26, 2018).
Non-Final Office Action for U.S. Appl. No. 15/369,241, (dated Aug. 31, 2018).
Final Office Action for U.S. Appl. No. 14/626,358, (dated Jul. 13, 2018).
Non-Final Office Action for U.S. Appl. No. 14/626,358, (dated Dec. 29, 2017).
Advisory Action for U.S. Appl. No. 14/626,358, (dated Nov. 17, 2017).
Final Office Action for U.S. Appl. No. 14/626,358, (dated Aug. 25, 2017).
Non-Final Office Action for U.S. Appl. No. 14/626,358, (dated Feb. 13, 2017).
Commonly-assigned, co-pending U.S. Appl. No. 15/369,241, for "Methods, Systems, and Computer Readable Mediums for Performing Metadata-Driven Data Collection," (Unpublished, filed Dec. 5, 2016).
Commonly-assigned, co-pending U.S. Appl. No. 14/626,358, for "Methods, Systems, and Computer Readable Mediums for Selecting and Configuring a Computing System to Support a Replicated Application," (Unpublished, filed Feb. 19, 2015).

* cited by examiner ns, and Computer Readable Mediums for Selecting and Configuring a Computing System to Support a Replicated Application

PRIORITY CLAIM

This application is a continuation of U.S. patent application Ser. No. 14/626,358 filed Feb. 19, 2015, the disclosure of which is incorporated herein by reference in its entirety.

TECHNICAL FIELD

The subject matter described herein relates to providing geographic redundancy as a service for deployed enterprise applications. More specifically, the subject matter relates to methods, systems, and computer readable mediums for selecting and configuring a computing system to support a replicated application.

BACKGROUND

The concept of utilizing geographic redundant computer clusters to support enterprise applications is a prevalent business practice that is recognized as a standard approach for the deployment of many telecommunications and/or web-based services. The notion is that an enterprise application, which is hosted by a computing system residing in a first geographic location, is replicated on a computing system that is situated at a second physical location that is geographically displaced from the first host site (e.g., hundreds of miles or kilometers away). This deployment arrangement effectively averts the consequences of unavoidable catastrophes (e.g., natural disasters) with respect to the service uptime of the given application since the computing system residing at the redundant site is able resume operations in lieu of the original host located at the primary site. Notably, the establishing of a geographically redundant site to host a replicated enterprise application involves several manual tasks that are associated with significant time overhead pertaining to the assessment and configuration of the selected site.

SUMMARY

Methods, systems, and computer readable mediums for selecting and configuring a computing system to support a replicated application are disclosed. According to one embodiment, a method includes capturing resource availability data associated with a plurality of computing systems, wherein each of the plurality of computing systems resides at a separate and distinct geographical site. The method further includes determining, for each of the plurality of computing systems, a suitability score based on the captured resource availability data and at least one external factor associated with the computing system, selecting one of the plurality of computing systems to host the replicated application based on the determined suitability scores, and establishing a logical environment on the selected computing system to support the enterprise application.

BRIEF DESCRIPTION OF THE DRAWINGS

The subject matter described herein will now be explained with reference to the accompanying drawings of which.

DETAILED DESCRIPTION

Figure 1:
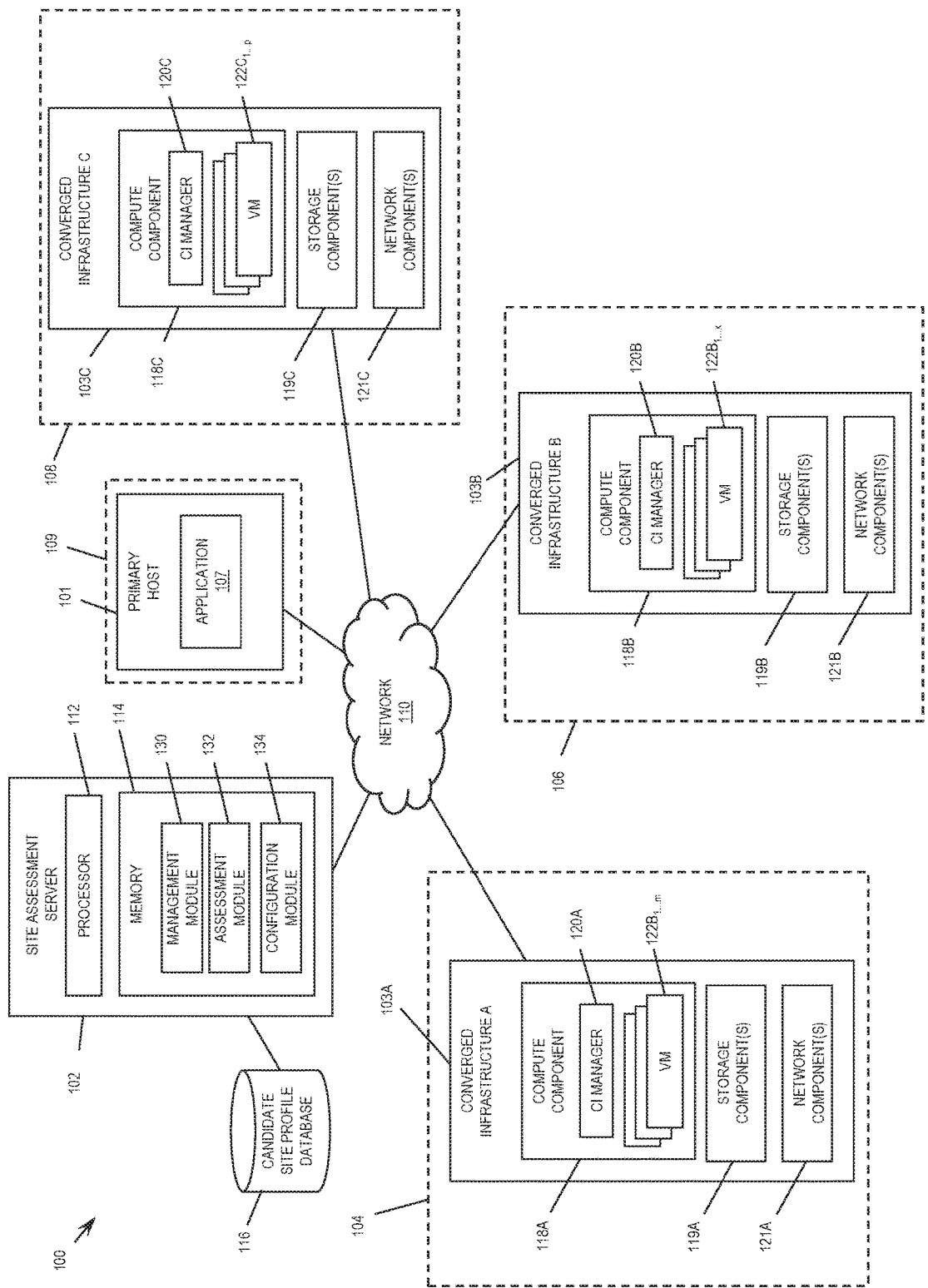
FIG. 1 illustrates a block diagram depicting an exemplary network system for selecting and configuring a computing system to support a replicated application in accordance with embodiments of the subject matter described herein.

The subject matter described herein discloses methods, systems, and computer readable mediums for selecting and configuring a computing system to support a replicated application. In some embodiments, the disclosed subject matter utilizes a special purpose site assessment server to facilitate geographic redundancy as a service (GRaaS) in a network environment. Notably, the site assessment server may be configured to acquire various metric information from a plurality of candidate computing systems (which are geographically separated) in order to select a target candidate computing system to host a replicated application. More specifically, the site assessment server may capture physical resource information and logical resource usage information associated with each of the candidate computing systems. In addition, the site assessment server may also acquire external factor data associated with each of the candidate computing systems. Utilizing the resource availability data and acquired external factor data, the site assessment server may determine a suitability score for each of the candidate computing systems. Based on the determined suitability scores, the host server may select and designate a computing system to join a geographically distributed computing cluster as the host for a replicated enterprise application. The site assessment server (e.g., via a management module) may subsequently initiate a configuration module, which is responsible for establishing the logical environment (e.g., the logical resources that are required in order for the enterprise application to execute/operate successfully) on the selected computing system. For example, the configuration module may send instructions to the selected computing system to provision virtual machines and associated software on the selected computing systems. Once the virtual machine(s) are established, the management module initiates the deployment and replication of the enterprise application on the selected computing system.

In some embodiments, the disclosed subject matter can be utilized within a network system that is distributed among a plurality of discrete network segments (e.g., a single computer network system location or a geographically separated computer network system) which may include converged infrastructures (CIs). As used herein, a CI, such as a Vblock® System from VCE Company, LLC, can comprise multiple converged infrastructure components in a preconfigured, pretested, and/or prepackaged computing platform that may be customized to the requirements of a user. For example, a CI can include a single computing platform unit associated with racks of physical CI components and related software for performing virtualization and/or other information technology (IT) functions. In some embodiments, each CI component associated with a CI can comprise a compute component, a software component, a networking component, a hardware component, or a firmware component. For example, a CI can comprise data storage devices, compute devices (e.g., a unified computing system device), networking equipment (e.g., switch devices), and software for managing physical resources and/or virtualized resources (e.g., virtual servers). In some embodiments, both the distributed network system and CI architecture may be utilized jointly together without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary network system, generally designated 100, according to an embodiment of the subject matter described herein. Network system 100 includes a primary host server 101, a site assessment server 102, and a plurality of computing systems, such as converged infrastructures (CIs) 103A-C. Although FIG. 1 depicts a plurality of CI systems, any other type of computing system may utilize the disclosed algorithms and modules without departing from the scope of the present subject matter. Primary host server 101 may be one of a plurality of computing systems (e.g., CIs) in a computing cluster that is responsible for hosting an enterprise application 107. Notably, primary host server 101 is located at a geographic location or site 109 (e.g., a particular data center facility). As used herein, an enterprise application may include an entire software application program or any portion thereof that utilizes a plurality of processes (e.g., subprograms, workload services, software algorithms, etc.) to perform an activity or service that may be useful to a user. Exemplary enterprise applications include, but are not limited to, an electronic mail service application, a web-based banking application, a multimedia streaming application, a stock trading platform application, and the like. In some embodiments, the enterprise application may be supported by one or more virtual machine executing the aforementioned software application.

In some embodiments, each CI 103 may include at least one compute component 118, which can comprise one or more processors and at least one memory. Each of the processors (not shown) included in compute component 118 may include a microprocessor (e.g., a trusted platform module (TPM) using trusted execution technology (TXT)), a central processing unit (CPU), or any other like hardware based processor unit. Likewise, the memory (not shown) in compute component 118 may include random access memory (RAM), read only memory (ROM), optical read/write memory, cache memory, magnetic read/write memory, flash memory, or any other non-transitory computer readable storage medium. In some embodiments, memory may also respectively include and/or support CI manager module 120 and at least one virtual machine (VM) 122. For example, one or more of VMs $122A_1 \ldots _m$ may be responsible for supporting a particular application that is hosted and/or executed by CI 103A. Although FIG. 1 only depicts three CIs 103A-C, network system 100 may include and/or utilize additional CIs without departing from the scope of the disclosed subject matter.

As indicated above, network system 100 may further include site assessment server 102 that is communicatively connected to each of CIs 103A-C. Site assessment server 102 may comprise either a dedicated computing machine or a CI that is configured for facilitating the disclosed subject matter. Notably, site assessment server 102 may be configured to capture resource availability data and/or external factor data associated with CIs 103A-C from each of CIs 103A-C. In some embodiments, each of CI managers 120A-C in CIs 103A-C may be communicatively linked to site assessment server 102 via a direct connection, a wireless connection, and/or through a communications network 110, such as the Internet. As shown in FIG. 1, site assessment server 102 may include a management module 130, an assessment module 132, a configuration module 134, at least one processor 112, and at least one memory 114. In some embodiments, processor 112 and memory 114 may be similar to the processor(s) and memory described above with respect to compute components 118A-C in both form and function. Notably, processor 112 and memory 114 may be used to execute and support management module 130, assessment module 132, and configuration module 134. In some embodiments, both management module 130 and CI manager modules 120A-C may comprise, or be a part of, VCE Vision™ Intelligent Operations software and/or firmware that may be executed by a processor or any other processing unit (e.g., compute components) residing in the hosting device.

In some embodiments, management module 130 may include a software module that is configured to coordinate the operation and execution of assessment module 132 and configuration module 134. Notably, management module 130 may be used to construct a site profile that defines prerequisites (e.g., hardware element requirements, software version requirements, performance metrics requirements, etc.) for each computing cluster supporting an enterprise application. More specifically, the site profile includes the requirements that are needed for each computing system in a computing cluster to properly support and operate a particular enterprise application. In some embodiments, site profiles may be stored in a candidate site profile database 116, which may reside locally in the site assessment server or may constitute an external data storage element (as shown in FIG. 1) that is accessible by site assessment server 102.

Upon receiving a notification that GRaaS is to be implemented for a particular enterprise application (e.g., application 107), management module 130 accesses the appropriate database entry in candidate site profile database 116 for the candidate site profile information as well as initiate assessment module 132. In response, assessment module 132 may be configured (e.g., preprogrammed by a system administrator) to communicate with the CI manager module 120 on each of CIs 103A-C. After establishing communications with CI manager 120, assessment module 132 may request relevant resource availability data and external factor data associated with each of CIs 103A-C. For example, assessment module 132 may be configured to conduct an automated check of available physical resources at a plurality of candidate CIs (e.g., CIs 103A-C). In some embodiments, assessment module 132 may comprise a monitoring tool that provides global visibility of physical resources, such as compute components, storage components, and network components, existing in a computing system and/or computer cluster. In some embodiments, assessment module 132 may be configured to send a resource availability query message to each of CIs 103A-C, which are respectively situated at geographical locations 104-108 (e.g., separate and distinct data center facilities). For example, the resource availability query message sent by assessment module 132 may comprise a ping-type message requesting the hardware information and status information associated with each of the CIs 103A-C in order to determine whether the physical layer of the candidate CI is capable of satisfying the cluster pre-requisites (i.e., as defined in the candidate site profile). In addition, assessment module 132 may send a ping message to each of CIs 103A-C in order to check the latency and network connectivity associated with the candidate sites. Notably, the resource availability data requested from the CI managers residing each of CIs 103A-C by assessment module 132 may include, but not limited to, i) time zone information, ii) geographic coordinate data (e.g., GPS coordinates), iii) security measure information, iv) quality of service information, v) hardware component information, vi) software component information, vii) logical configuration information, viii) resource availability data, ix) and network connectivity information, and x) historical data.

In some embodiments, assessment module 132 may also include a simple mail transaction protocol (SMTP) monitoring tool (e.g., Nagios) that is configured to acquire accurate historical data that is indicative of past performance and usage metrics of a particular candidate CI. Exemplary types of historical data may include periods of "downtime" experienced by the candidate CI, previously experienced issues on the candidate computing system, past CPU performance, past memory utilization, past services hosted, and the like. More specifically, the historical data may include information that indicates erratic behavior and/or system errors (e.g., initialization errors, processing errors, storage errors, etc.). Likewise, historical data may also include any past information pertaining to the respective capacities of the candidate CI's compute components (e.g., processor and memory usage), storage components (e.g., disk space and use), and network components (e.g., network bandwidth and throughput). Historical data may further include probability data associated with electrical down-time and/or network connectivity down-time as associated to a particular candidate CI. Notably, the historical data associated with a particular CI 103 may be stored in a storage component 119 and referenced and/or accessed via resource availability query messages sent from assessment module 132.

In some embodiments, the resource availability data may also include geographic coordinate data that may be utilized to determine location suitability of various sites. Specifically, such location data may be used to determine if predefined distance requirements of geographic redundancy for given software or hosted applications is satisfied. For example, the geographical location data may include any information (e.g., GPS coordinates) that indicates the physical and/or geographical position of the CI. In some embodiments, geographical location data may be recorded and stored by CI manager module 120. The use of geographical location information may be useful to identify candidate CIs that are sufficiently positioned far away (per a predefined physical distance threshold value) from primary host server 101 at site 109. Similarly, the resource availability data may also comprise quality of service information, which include data that represents the consistency of an associated power supply, the consistency of the candidate CI's cooling measures, and the like. In some embodiments, the resource availability data may further include an accounting of the available resources at a candidate site, such as CPU processing, RAM, memory, data storage, network bandwidth, and network visibility.

In some embodiments, assessment module 132 may also be configured to capture external factor data associated with each candidate CI. For example, assessment module 132 may query the CI manager at each of CIs 103A-C to request stability score information, which may comprise a risk-related probability value that is associated with the geographic site location. In some instances, the stability score probability may constitute a human calculated factor that is specific to each candidate site. In particular, the stability score may include a value that ranges from 0% (riskiest) to 100% (most stable/secure) and that serves to quantify potential external influences, such as likelihood of natural disasters, domestic terrorism, foreign terrorism, and the like.

Upon receiving the resource availability data and external factor data from each of CIs 103A-C, site assessment server 102 may execute assessment module 132 to conduct the determination of a suitability score associated with each CI. Namely, assessment module 132 processes the captured resource availability data and captured external factor data to calculate the candidate suitability scores. In some embodiments, assessment module 132 may be configured to assign a binary value (e.g., 0 or 1) to various data categories that may be predefined as critical. In one embodiment, assessment module 132 may recognize a software distance requirement or predefined threshold (e.g., 300 km), a network cluster latency requirement or predefined threshold (e.g., 20 ms), a resource availability requirement or predefined threshold, and a security measure requirement or predefined threshold (e.g., compliance with one or more established data center industry standards). For example, assessment module 132 may analyze the received geographical location information of a candidate CI and assign a binary value of "1" to the software distance requirement category if the physical distance between candidate CI and primary host 101 exceeds (or equals) a predefined distance threshold value (e.g., 300 km). Alternatively, assessment module 132 may assign a binary value of "0" to the software distance requirement category if the distance between candidate CI and primary host 101 does not exceed or equal the predefined distance threshold value. Using this Boolean-type model, assessment module 132 may eliminate a candidate CI for failing the requirements of any one of these aforementioned critical categories (e.g., attaining a "False" or "0" value).

If all of the critical data categories are satisfied, assessment module 132 may proceed by calculating a suitability score based on the probability information received from the candidate CIs. For example, assessment module 132 may be configured to assign a probability score (e.g., between 0% and 100%) for a number of considered metrics (e.g., metric data categories), such as a stability/risk factor, the probability of electrical down-time, the probability of network connectivity down-time, the probability of network bandwidth falling below a predefined threshold, and the like. After assigning values to each of these data categories, assessment module 132 may be configured to determine a suitability score for each candidate CI by i) adding the percentage values associated with each of the metric data categories and ii) dividing the calculated sum by the total number of data categories considered. For example, if the software distance requirement, the latency requirements, the resource availability requirement, and security requirements are determined to be satisfied (and assigned a binary value of "1") by assessment module 132 and the received probability scores associated with i) a stability factor, ii) a probability of electrical up-time, iii) a probability of network connectivity up-time, and iv) a probability of network bandwidth satisfying (e.g., equal to and/or greater) a predefined threshold are respectively defined as 85%, 95%, 97% and 93%, then assessment module 132 may be configured to utilize a suitability algorithm to calculate a suitability score of 92.5% (e.g., [85%+95%+97%+93%]÷4]. Notably, assessment module 132 can be configured to perform the suitability score calculation for each of each of candidate CIs 103A-C in order to determine the overall probability of an outage occurring at each these candidate CIs.

After performing the suitability score calculations for CIs 103A-C, assessment module 132 may be configured to compare all of the computed suitability scores with each other in order to designate the CI associated with the highest suitability score as the selected destination for the application to be replicated. Alternatively, assessment module 132 may present the determined suitability scores to a system administrator (e.g., via a GUI). For example, assessment module 132 may be configured present all of the suitability scores on a computer screen display, a mobile device screen, a control room display, or any other user interface and/or display that is used by an operator or administrator of network system 100. In such an embodiment, the user may select a CI or confirm the access module's selection of the CI associated with the highest suitability score as the selected destination for the replicated enterprise application.

As shown in FIG. 1, site assessment server 102 may also include a configuration module 134. In some embodiments, configuration module 134 may be adapted to configure virtual machines (VMs) that include identical resources of the primary site. For example, the configuration module may attempt to configure the resources available at the selected converged infrastructure (e.g., CI 103A) in a manner as similar to the primary host server 101. For example, configuration module may be configured to establish a logical environment on CI 103A that includes VMs comprising at least the same processing capabilities, the same storage capacities, and the same networking resources and associated configurations that are present on primary host server 101. Notably, the configuration of the virtual machines on the selected CI is conducted by configuration module 134 via automation. There are a number of different approaches that can be implemented to perform this configuration in an automated manner. In some embodiments, configuration module 134 may be embodied as an orchestration layer workflow executed by vCenter Orchestrator. In some embodiments, configuration module 134 may accomplish this by utilizing a configuration platform or suite, such as a Cloud Accelerator Services (CAS) platform developed by VCE. In some embodiments, configuration module 134 may also be adapted to communicate with a deployment module (not shown) that is responsible for provisioning the necessary software to the selected CI. For example, the deployment module may provision one or more virtual machines in the selected CI 103A with an operating system (OS) and an appropriate enterprise application.

As indicated above, the subject matter disclosed herein can be implemented in software in combination with hardware and/or firmware. For example, the subject matter described herein can be implemented in software executed by a processor (e.g., processor(s) 112 in FIG. 1). In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

For example, management module 130, assessment module 132, and/or configuration module 134 may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be appreciated that FIG. 1 illustrates an exemplary embodiment and that various nodes, their locations, and/or their functions as described above in relation to FIG. 1 may be changed, altered, added, or removed. It should be noted that in some embodiments, a site assessment server including assessment module 132 and configuration module 134 in FIG. 1 and/or functionality described herein may constitute a special purpose machine and/or device configured to provide geographic redundancy as a service (GRaaS). Further, assessment module 132 and/or functionality described herein can improve the technological field of GRaaS by providing improvements related to computer network resource management and strategic replication and provisioning of enterprise applications.

Figure 2:
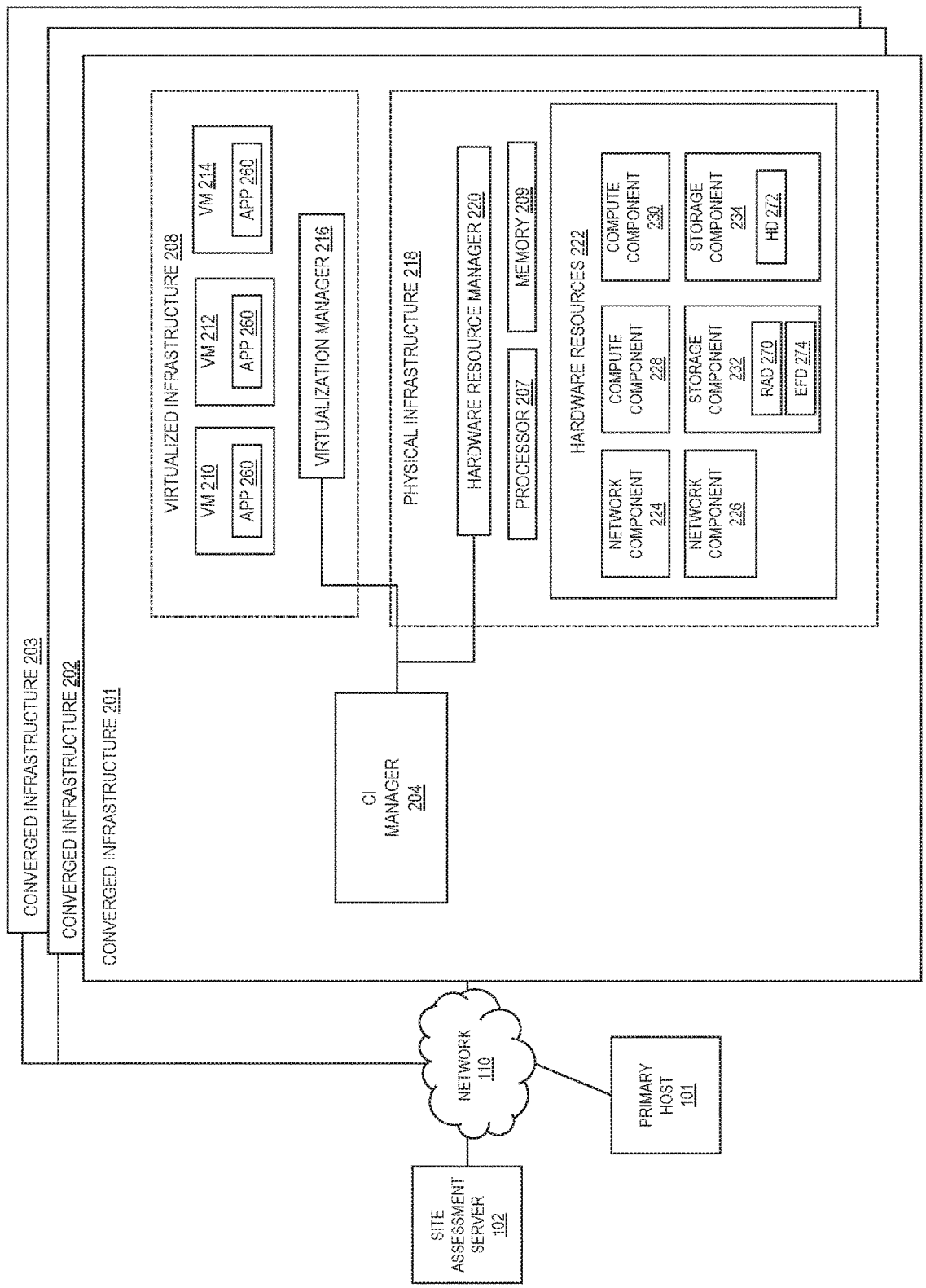
FIG. 2 illustrates a block diagram depicting an exemplary converged infrastructure for selecting and configuring a computing system to support a replicated application in accordance with embodiments of the subject matter described herein.

As indicated above, the disclosed subject matter can be utilized to assess the suitability of a CI to host a replicated enterprise application. FIG. 2 is a logical block diagram illustrating exemplary CIs 201-203 (similar to each of CIs 103A-C depicted in FIG. 1) according to an embodiment of the subject matter described herein. In some embodiments, each of CIs 201-203 can comprise a plurality of infrastructure elements, including one or more physical resources and one or more virtual resources. Exemplary physical resources can comprise processors, compute devices, network equipment, data storage devices, routers, switches, wiring or cabling, physical ports, and/or communications interfaces. Exemplary virtual resources can comprise a virtual entity (e.g., an entity that appears as a physical entity but comprises one or more CI components associated with one or more CIs) such as, but not limited to, a virtual machine, a virtual server, a virtual storage device, a virtual port, and/or a virtual communications interface. As indicated above, CI 201 includes at least one processor 207 that may comprise a microprocessor, a CPU, or any other like hardware based processor unit. Likewise, CI 201 includes memory 209 that may comprise RAM, ROM, optical read/write memory, cache memory, magnetic read/write memory, flash memory, or any other non-transitory computer readable medium. Notably, processor 207 may access and utilize memory 209 via a system bus or backplane to execute CI manager 204 in the manner described below. CI 201 may also comprise software and related CI components for managing the CI and/or portions therein. Although not depicted in FIG. 2, processor 207 and memory 209 may in some embodiments be part of a compute component, not unlike compute components 228-230.

In some embodiments, CI 201 can be configured to provide data storage functionality, cloud service functionality, and/or other IT functionality which can support a vast number of software enterprise applications. CI 201 can also be configured to communicate via network 110 with various other entities, such as CIs 202-203, primary host 101, and site assessment server 102, network nodes, and users. In some embodiments, CI 201 can comprise a CI manager 204 (e.g., a CI management module), a virtualized infrastructure 208, and/or a physical infrastructure 218. CI manager 204 may be any suitable entity for managing the operation of CI 201 and may be configured to communicate with various CI components, such as virtual resources, physical resources, and/or software for managing various CI components. For example, CI manager 204 may be configured to manage performance, resource utilization levels, and other aspects associated with virtualized infrastructure 208 and/or physical infrastructure 218. In some embodiments, CI manager 204 comprises VCE Vision™ Intelligent Operations software and/or firmware that may be executed by processor 207 or any other processing unit present in CI 201 (e.g., compute components 228-230).

In some embodiments, virtualized infrastructure 208 can comprise a virtualization environment configured to simulate components of a computing device (e.g., a processor and system memory) and a storage device for executing one or more virtual machines (VMs). For example, each of VM 210, VM 212, and VM 214 may be configured to perform various functions and/or services, such as web server functions, application server functions, or cloud application services, and may interact with various nodes, components, and/or users.

In some embodiments, virtualized infrastructure 208 may be associated with one or more virtual entities. Each virtual entity can comprise one or more CI or portions therein, such as underlying infrastructure elements (e.g., components 224-234) from one or more CIs. In some embodiments, virtualization manager 216 may allow logical entities to be created, deleted, or modified using an API, a GUI, or a CLI. Virtualization manager 216 may be any suitable entity (e.g., software executing in a virtual machine) for managing aspects associated with virtualized infrastructure 208. In some embodiments, virtualization manager 216 may be configured to provide management functionality through one or more communications interfaces. For example, virtualization manager 216 may communicate with CI manager 204 using one or more APIs. In some embodiments, virtualization manager 216 may obtain resource availability data from each of virtual machines 210-214 prior to forwarding the resource availability data to CI manager 204.

Physical infrastructure 218 can comprise hardware resources 222, such as network components 224-226, compute components 228-230 (sometimes referred to as "hosts", compute devices, and/or compute servers), and storage components 232-234 (e.g., functioning as a storage area network (SAN)). Hardware resources 222 may be communicatively connected to various other components in CI 201 and other entities. Hardware resources 222 can be configured to support one or more virtual entities. For example, compute component 228 and storage component 232 may be used in implementing VM 210 and VM 212 while compute component 230 and storage component 234 may be used in implementing VM 214 and virtualization manager 216. In some embodiments, network components 224-226 (e.g., network switches) may be configured to enable communication between the resources within the CI.

In some embodiments, compute components 228-230 can include a hypervisor that may be configured to function as a host operating system and/or a virtual machine that runs as one or more guest applications (e.g., operating systems) within the hypervisor. As used herein, the term "hypervisor" can refer to computer software, firmware and/or hardware that is responsible for creating, hosting and managing guest virtual machines running on a host machine. In some embodiments, a hypervisor can be configured to function as a host operating system configured to support one or more guest operating systems. Notably, each guest operating system can function within the hypervisor as a virtual machine and provide a platform for executing various application workload services and/or enterprise applications. As previously indicated, compute components 228-230 can be configured to implement virtual machines 210-214, which in turn can be configured to host virtual entities including a virtual machine, a virtual server, a virtual storage device, a virtual port, and/or a virtual communications interface, and can require a virtualization software specific credential.

Hardware resource manager 220 may be any suitable entity (e.g., software executing in a virtual machine) for managing aspects associated with physical infrastructure 218. In some embodiments, hardware resource manager 220 may be configured to provision hardware resources 222 via one or more communications interfaces. For example, hardware resource manager 220 may provision hardware resources 222 in order to implement one or more virtual entities in virtualized infrastructure 208. In some embodiments, hardware resource manager 220 may comprise any management component or entity, such as a unified infrastructure manager (UIM) or a unified computing system (UCS) director entity, which is configured to manage and/or provision the physical hardware of CI 201.

In some embodiments, hardware resource manager 220 may be configured to monitor and/or record resource availability data pertaining to each of network components 230-232, compute components 224-226, and storage component 228. Upon receiving a request message from site assessment server 102, CI manager 204 may communicate with hardware resource manager 220 to request the resource availability data (e.g., resource availability data 270 stored in storage component 232). Hardware resource manager 220 may then forward any collected resource availability data to CI manager 204, which in turn sends the data to site assessment server 102. Likewise, hardware resource manager 220 may also be configured to obtain stored historical data (e.g., historical data 272) and stored external factor data (e.g., external factor data 274) from storage components 232-234 and subsequently forwards the acquired data to CI manager 204. In some embodiments, hardware resource manager 220 may be configured to record information pertaining to i) the model type and quantity of hardware elements (e.g., hardware processors, memory chips, etc.) and ii) the type and version number of the deployed software utilized by the hardware elements. Likewise, this information is stored as resource availability data 270 and may be similarly provided to site assessment server 102 via CI manager 204 upon request.

In some embodiments, one or more of data storage components 232-234 may be configured to function as a repository and store CI component information (e.g., data indicating which CI components are supporting an application and/or application processes, performance metric data associated with CI components 224-232, etc.). In some embodiments, CI manager 204 may utilize an API interface (e.g., a RESTful API) to access storage components 232-234 (via hardware resource manager 220) in order to access any stored performance and/or utilization resource availability data and/or historical data that has been previously collected by hardware resource manager 220 and virtualization manager 216.

In some embodiments, CI manager 204 can be utilized to request and process resource availability data received from the CI components via hardware resource manager 220 in CI 201. For example, CI manager 204 may be configured to receive query messages from site assessment server 102. In response, CI manager 204 may request and receive resource availability data and historical data from each of network components 224-226, compute components 228-230, storage components 232-234, virtual machines 210-214 and/or their respective operating systems (not shown).

It will be appreciated that FIG. 2 is a logical block diagram that illustrates an exemplary embodiment and that various nodes, their locations, and/or their functions as described above in relation to FIG. 2 may be changed, altered, added, or removed.

Figure 3:
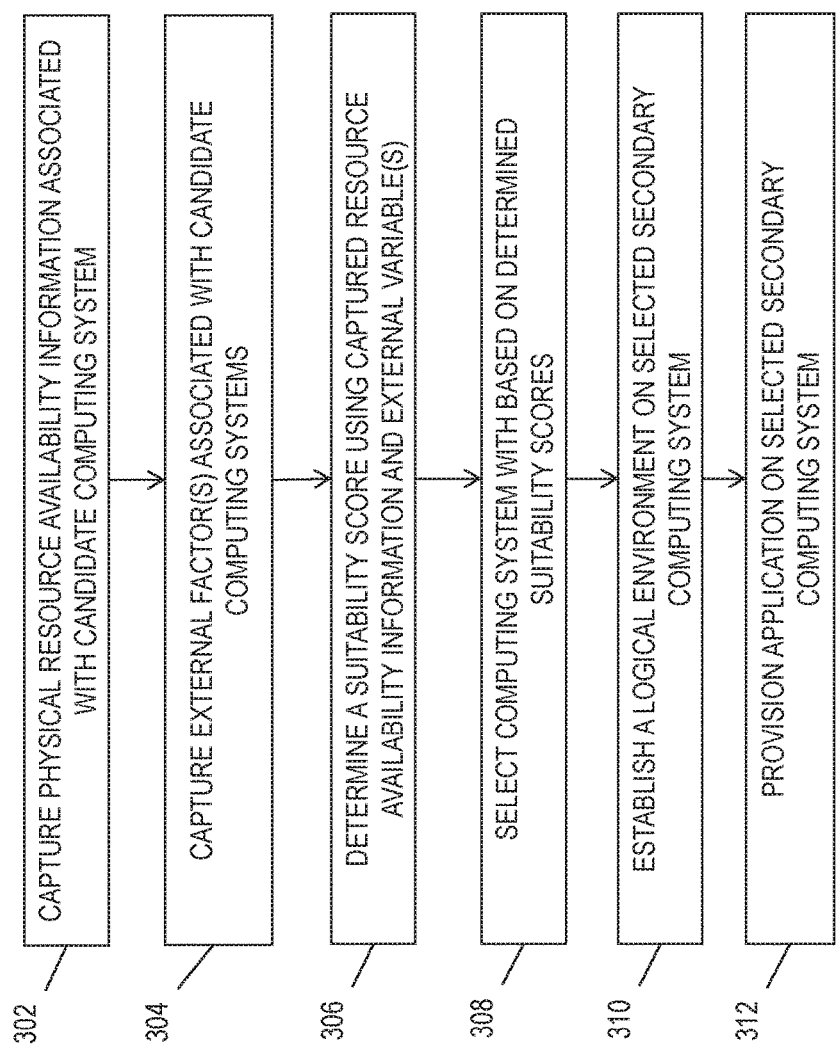
FIG. 3 illustrates a flow chart of an exemplary process for selecting and configuring a computing system to support a replicated application in accordance with embodiments of the subject matter described herein.

FIG. 3 illustrates a flow chart of an exemplary method 300 for selecting and configuring a computing system to support a replicated application in a converged infrastructure network environment in accordance with embodiments of the subject matter described herein. The following process is also described with respect to system 100 in FIG. 1 and CIs 201-203 in FIG. 2 as an exemplary embodiment.

At step 302, physical resource availability data is captured. In one example with reference to FIG. 1, a system administrator may wish to identify a computing system (e.g., a CI) at computing network location (e.g., a data center facility) to serve as a geographic redundant host site in a network environment (e.g., network system 100 that includes CIs 103A-C) for the replication of an enterprise application hosted at a primary host site. Notably, the enterprise application may currently require certain physical resources offered by the primary host site and may further require a secondary host (to support the replicated application) that is i) geographically separated from a primary host by at least a predefined distance and ii) is compliant with the requirements of the cluster or the supporting primary host server.

In some embodiments, assessment module 132 may be configured to send resource availability query messages to the candidate computing systems (e.g., CIs 103A-C in FIG. 1) residing in the administrator's network environment (e.g., network system 100). In some embodiments, the candidate CIs may each include a CI manager 120A, which in turn may be configured to query components contained within that CI in order to obtain resource availability data. In some embodiments, this resource availability data may include data such i) time zone information, ii) geographic coordinate data (e.g., GPS coordinates), iii) security measure information, iv) quality of service information, v) hardware component information, vi) software component information, vii) logical configuration information, viii) resource availability data, ix) and network connectivity information, and x) historical data which is stored in storage components and accessible by assessment module 132 via a local CI manager. In some embodiments, resource availability query messages may comprise low level messages, such as ping messages, that are configured to check attributes such as latency and connectivity levels experienced at by CIs 103A-C.

At step 304, external factor data associated with each candidate computing system is captured. In some embodiments, assessment module 132 may be configured to query a CI manager 120 for external factor information. The CI manager 120 may then query a local data store, such as storage component 119. For example, storage component 119 may host a database storing one or more external factors, variables, and/or values that represent the probability that the candidate computing system will experience an outage due to an external factor. Exemplary external factors associated with a particular candidate CI may represent risk and/or stability variables associated with probabilities such as the likelihood of the candidate CI being terminated or immobilized due to a natural disaster, domestic terrorism, foreign terrorism, or the like (or the converse).

At step 306, a suitability score for each of the plurality of candidate computing systems is determined. In some embodiments, assessment module 132 may be configured to calculate the level of suitability associated with each candidate CI to serve as a secondary/redundant host for the enterprise application to be replicated.

Upon receiving the query, each of CI managers 120A-C may respectively prompt a number of components and/or component managers in CIs 118A-C to provide resource data CI manager 120A, which in turn forwards the resource availability data to assessment module 132 via network 110. In some embodiments, CI manager 120A may also query hardware resource manager 220 and virtualization manager 216 to obtain resource availability data associated with virtual machines 210-214 and hardware components 224-232. For example, CI manager 120A may query a hardware resource manager (e.g., hardware resource manager 220 in FIG. 2) to obtain resource availability data of the collective hardware resources (e.g., components 118A, 119A, and 121A in FIG. 1) on CI 103A. In some embodiments, CI manager 120A may also provide information regarding the CI's geographical location (e.g., physical location information of the CI that may be recorded and maintained by the CI manager or a data storage component).

In step 308, a computing system is selected based on the determined suitability scores. For example, after determining the suitability score for each of CI 103A-C, assessment module 132 may compare and/or rank the calculated suitability scores. In some embodiments, assessment module 132 may subsequently identify the CI associated with the highest (i.e., greatest/largest numerical value) suitability score and designate that CI as the secondary host for the enterprise application to be replicated. For example, after determining the suitability score for all of the CIs, assessment module 132 may compare the calculated suitability scores with each other. In some embodiments, assessment module 132 may then identify the CI associated with the smallest (i.e., least numerical value) suitability score and initiate the replication and/or deployment of the enterprise application on the identified CI.

In step 310, a logical environment is established on the selected secondary computing system. In some embodiments, configuration module 134 may be configured to deploy the replicated application to the identified computing system. Notably, after the logical configuration (e.g., the logical resources that are required in order for the enterprise application to execute/operate successfully) of the selected CI is completed, configuration module 134 may send instructions to a module or server that is configured to initiate the provisioning the enterprise application. In some embodiments, the configuration module 134 may then deploy operating systems and the application in one or more virtual machines on the selected CI.

For example, configuration module 134 may communicate with the selected CI via instructions that configure the logical resources, such a virtual machines, virtual switches (e.g., vSwitches), and associated storage elements (e.g., LUNs). In some embodiments, configuration module 134 may also send instruction messages to instruct the CI to configure its interfaces for monitoring query messages, such as heartbeat links. After the logical resources are configured, configuration module 134 (e.g., via a deployment module) may send instruction messages directing the CI to configure/deploy the requisite operating system on the virtual machines (i.e., guest machines) using the logical resources previously created (e.g., the virtual machines).

In step 312, the application is provisioned on the selected secondary computing system. In some embodiments, after configuring the operating system on the virtual machine(s) designated to support the replicated application, configuration module 134 may be adapted to provision and deploy the replicated application on the virtual machines hosted by the identified CI. The application is subsequently installed and configured.

As indicated above, the subject matter described herein can be implemented in software in combination with hardware and/or firmware. For example, the subject matter described herein can be implemented in software executed by a hardware processor. In one exemplary implementation, the subject matter described herein can be implemented using a computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for selecting and configuring a computing system to support a replicated enterprise application, the method comprising:
   capturing, by a site assessment server, resource availability data associated with a plurality of computing systems, wherein each of the plurality of computing systems is a single computing platform unit that resides at a separate and distinct geographical site from the other computing systems, wherein capturing the resource availability data includes receiving, by the site assessment server, the resource availability data from each of the plurality of computing systems in response to a resource availability query message sent by the site assessment server to each of the plurality of computing systems;
   determining, by the site assessment server for each of the plurality of computing systems, a suitability score based on the captured resource availability data corresponding to virtual resources of the computing system and at least one external factor associated with the computing system;
   selecting, by the site assessment server, one of the plurality of computing systems to host a replicated enterprise application based on the determined suitability scores; and
   establishing, by the site assessment server, a logical environment on the selected computing system to support the replicated enterprise application.

2. The method of claim 1 wherein the computing systems include converged infrastructure (CI) systems.

3. The method of claim 1 wherein capturing resource availability data includes monitoring the logical resource usages and configurations.

4. The method of claim 1 wherein the resource availability data includes at least one member selected from a group consisting of time zone information, geographical coordinate information, quality of services information, hardware identification information, software version information, logical configuration information, and network connectivity information.

5. The method of claim 1 wherein the selected computing system comprises the computing system among the plurality of computing systems that is associated with the highest suitability score.

6. The method of claim 1 wherein establishing a logical environment includes confirming that physical resources required to support the replicated enterprise application are available at the selected computing system and establishing virtual machines at the selected computing system.

7. The method of claim 6 further comprising:
   deploying an operating system and the replicated enterprise application on each of the virtual machines hosted by the selected computing system.

8. A system for selecting and configuring a computing system to support a replicated enterprise application, the system comprising:
   at least one processor;
   memory;
   an assessment module utilizing the at least one processor and the memory in a site assessment server, wherein the assessment module is configured to:
      capture resource availability data associated with a plurality of computing systems, wherein each of the plurality of computing systems is a single computing platform unit that resides at a separate and distinct geographical site from the other computing systems, wherein the assessment module is configured to receive the resource availability data from each of the plurality of computing systems in response to sending a resource availability query message to each of the plurality of computing systems;
      determine for each of the plurality of computing systems a suitability score based on the captured resource availability data corresponding to virtual resources of the computing system and at least one external factor associated with the computing system; and
      select one of the plurality of computing systems to host a replicated enterprise application based on the determined suitability scores; and
   a configuration module utilizing the at least one processor and the memory, wherein the configuration module is configured to establish a logical environment on the selected computing system to support the replicated enterprise application.

9. The system of claim 8 wherein the computing systems include converged infrastructure (CI) systems.

10. The system of claim 8 wherein the assessment module is further configured to monitor the logical resource usages and configurations.

11. The system of claim 8 wherein the resource availability data includes at least one member selected from a group consisting of time zone information, geographical coordinate information, quality of services information, hardware identification information, software version information, logical configuration information, and network connectivity information.

12. The system of claim 8 wherein the selected computing system comprises the computing system among the plurality of computing systems that is associated with the highest suitability score.

13. The system of claim 8 wherein the configuration module is further configured to confirm that physical resources required to support the replicated enterprise application are available at the selected computing system and establish virtual machines at the selected computing system.

14. The system of claim 13 wherein the configuration module is further configured to deploy an operating system and the replicated enterprise application on each of the virtual machines hosted by the selected computing system.

15. A non-transitory computer readable medium having stored thereon executable instructions which, when executed by a processor of a computer, cause the computer to perform steps comprising:

capturing resource availability data associated with a plurality of computing systems, wherein each of the plurality of computing systems is a single computing platform unit that resides at a separate and distinct geographical site from the other computing systems, wherein capturing the resource availability data includes receiving, by the site assessment server, the resource availability data from each of the plurality of computing systems in response to a resource availability query message sent by the site assessment server to each of the plurality of computing systems;

determining for each of the plurality of computing systems a suitability score based on the captured resource availability data corresponding to virtual resources of the computing system and at least one external factor associated with the computing system;

selecting one of the plurality of computing systems to host a replicated enterprise application based on the determined suitability scores; and establishing a logical environment on the selected computing system to support the replicated enterprise application.

16. The computer readable medium of claim 15 wherein the computing systems include converged infrastructure (CI) systems.

17. The computer readable medium of claim 15 wherein capturing resource availability data includes monitoring the logical resource usages and configurations.

18. The computer readable medium of claim 15 wherein the resource availability data includes at least one of time zone information, geographical coordinate information, quality of services information, hardware identification information, software version information, logical configuration information, and network connectivity information.

19. The computer readable medium of claim 15 wherein establishing a logical environment includes confirming that physical resources required to support the replicated enterprise application are available at the selected computing system and establishing virtual machines at the selected computing system.

20. The computer readable medium of claim 19 further comprising deploying an operating system and the replicated enterprise application on each of the virtual machines hosted by the selected computing system.

* * * * *